US012763666B2

(12) United States Patent
Duan et al.

(10) Patent No.: US 12,763,666 B2
(45) Date of Patent: Oct. 13, 2026

(54) CHARGE PUMP DRIVE CIRCUIT AND DRIVE CONTROL SYSTEM

(71) Applicant: CHENGDU CONVENIENTPOWER SEMICONDUCTOR CO., LTD., Sichuan (CN)

(72) Inventors: Xindong Duan, Sichuan (CN); Bo Zhang, Sichuan (CN); Jian Qing, Sichuan (CN)

(73) Assignee: CHENGDU CONVENIENTPOWER SEMICONDUCTOR CO., LTD., Sichuan (CN)

( * ) Notice: Subject to any disclaimer, the term of this patent is extended or adjusted under 35 U.S.C. 154(b) by 0 days.

(21) Appl. No.: 18/868,578

(22) PCT Filed: May 15, 2024

(86) PCT No.: PCT/CN2024/093475
§ 371 (c)(1),
(2) Date: Nov. 22, 2024

(87) PCT Pub. No.: WO2024/235267
PCT Pub. Date: Nov. 21, 2024

(65) Prior Publication Data
US 2026/0128664 A1 May 7, 2026

(30) Foreign Application Priority Data
May 15, 2023 (CN) ........................ 202310538910.4

(51) Int. Cl.
*H02M 1/08* (2006.01)
*H02M 3/07* (2006.01)

(52) U.S. Cl.
CPC ............... *H02M 1/08* (2013.01); *H02M 3/07* (2013.01)

(58) Field of Classification Search
CPC ................................. H02M 1/08; H02M 3/07
See application file for complete search history.

(56) References Cited

U.S. PATENT DOCUMENTS

2010/0308785 A1* 12/2010 Couleur ............... H02M 3/158 323/282

FOREIGN PATENT DOCUMENTS

CN 101335486 A * 12/2008

* cited by examiner

*Primary Examiner* — Daniel C Puentes
(74) *Attorney, Agent, or Firm* — Casimir Jones, S.C.; Tanya A. Arenson

(57) ABSTRACT

Provided are charge pump drive circuit and drive control system. Charge pump drive circuit includes charge pump and at least two drive units, wherein drive unit includes control signal generation module and drive voltage output module. Control signal generation module is connected to drive voltage output module and is configured to generate first control signal and second control signal, and output first control signal and second control signal to drive voltage output module. Drive voltage output module is connected to output terminal of charge pump, and input terminal of charge pump is configured to receive clock signal. Charge pump is configured to time-share provision of drive voltage to each drive voltage output module according to clock signal. Drive voltage output module is configured to adjust signal output mode according to first control signal and second control signal and to output drive voltage to an external electrical device.

15 Claims, 2 Drawing Sheets

CHARGE PUMP DRIVE CIRCUIT AND DRIVE CONTROL SYSTEM

CROSS-REFERENCE TO RELATED APPLICATION

The present disclosure is a national phase application under 35 U.S.C. § 371 of PCT International Application No.: PCT/CN2024/093475, filed on May 15, 2024, which claims the benefit of Chinese patent application with the filling No. 2023105389104 filed with the Chinese Patent Office on May 15, 2023, and entitled "CHARGE PUMP DRIVE CIRCUIT AND DRIVE CONTROL SYSTEM", the contents of which are incorporated herein by reference in entirety.

TECHNICAL FIELD

The present disclosure relates to the technical field of power electronics and, specifically, to a charge pump drive circuit and a drive control system.

BACKGROUND ART

During the process of providing power to the working circuit, it is generally required to provide power using a high-side power transistor, and the switching of the high-side power transistor is typically driven based on the power supply of the charge pump.

In the prior art, when driving multiple high-side power transistors, multiple charge pumps are commonly used to drive the multiple high-side power transistors separately.

However, adopting multiple charge pumps leads to an increase in the area occupied by components within the circuit, and leads to increased power consumption of the circuit.

SUMMARY

The objective of the present disclosure is to provide a charge pump drive circuit and a drive control system, which can reduce the number of charge pumps used and decrease the power consumption of the circuit.

The embodiments of the present disclosure are implemented as follows.

The present disclosure provides the embodiment of a charge pump drive circuit, including a charge pump and at least two drive units, wherein each drive unit includes a control signal generation module and a drive voltage output module.

The control signal generation module is connected to the drive voltage output module. The control signal generation module is configured to generate a first control signal and a second control signal, and to output the first control signal and the second control signal to the drive voltage output module, so as to control the drive voltage output module to output the voltage.

The drive voltage output module is connected to the output terminal of the charge pump, and the input terminal of the charge pump is configured to receive a clock signal. The charge pump is configured to time-share the provision of drive voltage to each drive voltage output module according to the clock signal. The drive voltage output module is configured to adjust the signal output mode according to the first control signal and the second control signal and to output the drive voltage to an external electrical device.

Optionally, the drive voltage output module includes a first switch, a second switch, and a drive output terminal.

A first terminal of the first switch is connected to the charge pump, and a second terminal of the first switch is connected to a first terminal of the second switch and the drive output terminal, respectively. The second terminal of the second switch is grounded.

The control terminal of the first switch and the control terminal of the second switch are connected to the control signal generation module, respectively.

The drive output terminal is configured to provide a drive signal to an external electrical device.

Optionally, the control signal generation module includes a first signal generator.

The output terminal of the first signal generator is connected to the control terminal of the first switch and the control terminal of the second switch, respectively.

The input terminal of the first signal generator is configured to receive a blanking signal and a first enable signal.

Optionally, the first signal generator is a logic control circuit.

Optionally, the control signal generation module further includes a second signal generator.

The output terminal of the second signal generator is connected to the input terminal of the first signal generator and is configured to provide the blanking signal to the first signal generator.

The input terminal of the second signal generator is configured to receive a second enable signal and a clock signal, and the second signal generator is configured to generate the blanking signal according to the second enable signal and the clock signal.

Optionally, the second signal generator is a logic control circuit.

The present disclosure further provides an embodiment of a drive control system, including a clock signal generation device, a charge pump drive circuit, at least two communication power supply devices, and a working circuit.

The communication power supply devices are connected to the charge pump drive circuit and the working circuit, respectively. The charge pump drive circuit is configured to provide a drive signal to the communication power supply devices, and the communication power supply devices are configured to provide a working voltage to the working circuit based on the drive signal.

The clock signal generation device is connected to the charge pump drive circuit, and the clock signal generation device is configured to provide a clock signal to the charge pump drive circuit.

Optionally, the communication power supply device is a high-side power transistor. A first terminal of the high-side power transistor is connected to the working circuit, a second terminal of the high-side power transistor is connected to the power supply, and a third terminal of the high-side power transistor is connected to the charge pump drive circuit.

Optionally, a number of high-side power transistors is the same as a number of drive units in the charge pump drive circuit.

Optionally, the third terminal of each high-side power transistor is connected to the drive output terminal in the drive voltage output module of each drive unit in the charge pump drive circuit, respectively.

The beneficial effects of the embodiments of the present disclosure include the following.

The present disclosure provides the embodiment of a charge pump drive circuit and a drive control system, including a charge pump and at least two drive units, wherein each drive unit includes a control signal generation module and a drive voltage output module. The control signal generation module is connected to the drive voltage output module. The control signal generation module can generate a first control signal and a second control signal, and output the first control signal and the second control signal to the drive voltage output module. Further, the charge pump can time-share the provision of drive voltage to each drive voltage output module according to the clock signal so that the drive voltage output module adjusts the signal output mode according to the first control signal and the second control signal and outputs the drive voltage to an external electrical device. The charge pump can ensure that no mutual interference occurs between the drive units, thus reducing the area occupied by components in the circuit by using only a single charge pump, and, correspondingly, decreasing the overall power consumption of the circuit.

BRIEF DESCRIPTION OF DRAWINGS

In order to more clearly illustrate the technical solutions of the embodiments of the present disclosure, the following will briefly introduce the drawings used in the embodiments. It should be understood that the following drawings only show some embodiments of the present disclosure, and therefore it should not be regarded as a limitation on the scope. Those ordinary skilled in the art can also obtain other related drawings based on these drawings without inventive effort.

Figure 1:
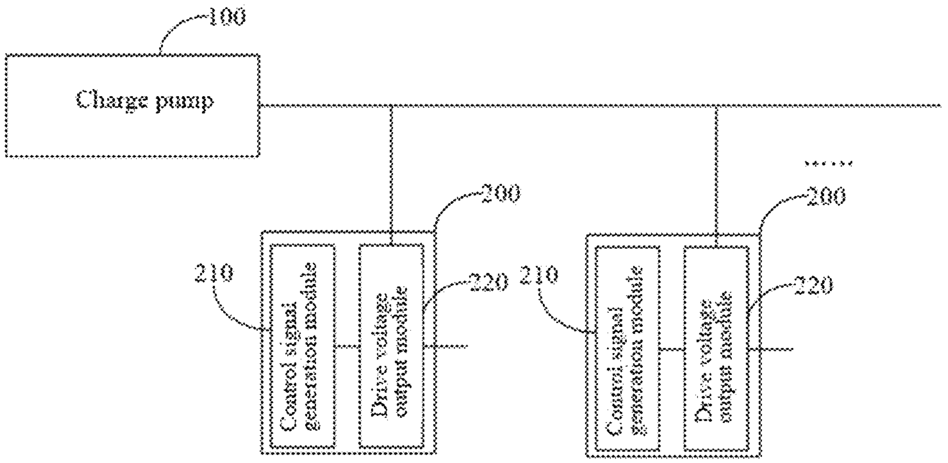
FIG. 1 is a structural schematic diagram of a charge pump drive circuit provided in the embodiment of the present disclosure.

Reference numerals: 10—clock signal generation device; 20—charge pump drive circuit; 30—communication power supply device; 40—working circuit; 100—charge pump; 200—drive unit; 210—control signal generation module; 220—drive voltage output module; S1—first switch; S2—second switch; O—drive output terminal; U1—first signal generator; U2—second signal generator; M—high-side power transistor.

DETAILED DESCRIPTION OF EMBODIMENTS

In order to make the objectives, technical solutions, and advantages of the embodiments of the present disclosure clearer, the technical solutions in the embodiments of the present disclosure will be clearly and completely described below in conjunction with the drawings in the embodiments of the present disclosure. It is evident that the described embodiments are part of the embodiments of the present disclosure, but not all of the embodiments. The components of the embodiments of the present disclosure described and illustrated in the drawings can typically be arranged and designed in various different configurations.

Therefore, the following detailed description of the embodiments of the present disclosure provided in the drawings is not intended to limit the scope of the present disclosure for which protection is claimed, but merely represents selected embodiments of the present disclosure. Based on the embodiments of the present disclosure, all other embodiments obtained by those skilled in the art without inventive effort shall fall within the scope of protection of the present disclosure.

It should be noted that similar numerals and letters denote similar terms in the following drawings so that once an item is defined in one drawing, it does not need to be further discussed in subsequent drawings.

In the description of the present disclosure, it should be noted that the terms "first," "second," "third," etc., are solely used to distinguish descriptions and should not be understood as indicating or implying relative importance.

It should be noted that, in the prior art, in the process of driving a working circuit, a charge pump is generally used for driving. In cases where there are multiple working circuits, using the same charge pump for driving generally causes mutual interference between different drive circuits. Therefore, in the prior art, it is typically necessary to arrange a corresponding number of charge pumps to achieve the driving of different drive circuits.

However, arranging multiple charge pumps leads to a relatively large area occupied by the entire circuit and correspondingly results in higher circuit power consumption. In view of this, the present disclosure provides a charge pump drive circuit to address the above issues present in the prior art.

The structure of the charge pump drive circuit provided in the embodiment of the present disclosure and its corresponding working principle are explained below.

FIG. 1 is a structural schematic diagram of a charge pump drive circuit provided in the embodiment of the present disclosure. Referring to FIG. 1, the charge pump drive circuit includes a charge pump 100 and at least two drive units 200, wherein each drive unit 200 includes a control signal generation module 210 and a drive voltage output module 220.

The control signal generation module 210 is connected to the drive voltage output module. The control signal generation module 210 is configured to generate a first control signal and a second control signal, and output the first control signal and the second control signal to the drive voltage output module 220. The drive voltage output module 220 is connected to the output terminal of the charge pump 100, and the input terminal 100 of the charge pump is configured to receive a clock signal. The charge pump 100 is configured to time-share the provision of drive voltage to each drive voltage output module 220 according to the clock signal. The drive voltage output module 220 is configured to adjust the signal output mode according to the first control signal and the second control signal and to output the drive voltage to an external electrical device.

Optionally, the charge pump 100 can be a charge pump with multiple outputs, and the charge pump 100 can receive an externally input clock signal.

Optionally, the charge pump 100 can provide drive voltage to different drive units 200 in a time-sharing manner according to the clock signal. For example, it can provide drive voltage to the drive voltage output module 220 within the first drive unit during a first time interval and provide drive voltage to the drive voltage output module 220 within the second drive unit during a second time interval.

Correspondingly, the above example is explained using two drive units as a case; however, in actual implementations, if there are three or more drive units, different drive voltage supply methods can be used to provide drive voltage to each drive unit individually.

Optionally, each drive unit 200 can provide a drive signal to an external circuit under the supply of the drive voltage.

The control signal generation module 210 can be configured to generate control signals, such as the aforementioned first control signal and second control signal. After generating the aforementioned control signals, the control signal generation module 210 can send the control signals to the drive voltage output module 220. The drive voltage output module 220 can provide various types of output modes, which can allow the signal output mode of the drive voltage output module 220 to be adjusted via the aforementioned first control signal and second control signal, and provide a drive signal to an external electrical device.

For example, each drive unit 200 can be configured with a corresponding control signal generation module 210 and drive voltage output module 220. The first control signal and second control signal, generated by each control signal generation module 210, can control the signal output mode of the drive voltage output module 220 that corresponds to the control signal generation module 210.

Optionally, if the drive voltage output module 220 includes two different signal output modes, the signal output modes can be adjusted and controlled by changing the content of the first control signal and/or the second control signal, thereby allowing the drive signal to be output in the corresponding signal output mode based on actual requirements.

The present disclosure provides the embodiment of a charge pump drive circuit, which can include a charge pump and at least two drive units, wherein each drive unit includes a control signal generation module and a drive voltage output module. The control signal generation module is connected to the drive voltage output module. The control signal generation module can generate a first control signal and a second control signal, and output the first control signal and the second control signal to the drive voltage output module. Further, the charge pump can time-share the provision of drive voltage to each drive voltage output module according to the clock signal so that the drive voltage output module adjusts the signal output mode according to the first control signal and the second control signal and outputs the drive voltage to an external electrical device. The charge pump can ensure that no mutual interference occurs between the drive units, thus reducing the area occupied by components in the circuit by using only a single charge pump, and, correspondingly, decreasing the overall power consumption of the circuit.

The structural relationship and working principle of the drive voltage output module provided in the embodiment of the present disclosure are explained below.

Figure 2:
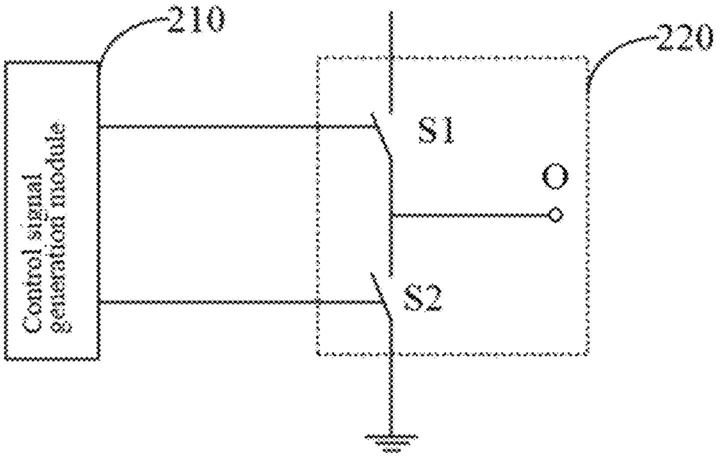
FIG. 2 is a structural schematic diagram of a drive voltage output module in a charge pump drive circuit provided in the embodiment of the present disclosure.

FIG. 2 is a structural schematic diagram of a drive voltage output module in a charge pump drive circuit provided in the embodiment of the present disclosure. Referring to FIG. 2, the drive voltage output module 220 includes a first switch S1, a second switch S2, and a drive output terminal O.

A first terminal of the first switch S1 is connected to the charge pump 100, and a second terminal of the first switch S1 is connected to a first terminal of the second switch S2 and the drive output terminal O, respectively. The second terminal of the second switch S2 is grounded. The control terminal of the first switch S1 and the control terminal of the second switch S2 are connected to the control signal generation module 210, respectively. The drive output terminal O is configured to provide a drive signal to an external electrical device.

Optionally, both the first switch S1 and the second switch S2 can be controlled switches with control terminals, which can change their states by receiving control signals at the control terminals. For example, they can switch from a closed state to an open state or an open state to a closed state.

Within the drive voltage output module 220, the first switch S1 and the second switch S2 can be connected in series. The first switch S1 can receive the first control signal, and the second switch S2 can receive the second control signal. The first switch S1 can change its open or closed state based on the first control signal, and the second switch S2 can change its open or closed state based on the second control signal.

During actual operation, there can be three states for the first switch S1 and the second switch S2 as follows. The first state is the non-output state of the drive signal, wherein both the first switch S1 and the second switch S2 are open. The second state is where the first switch S1 is closed, and the second switch S2 is open, which directly outputs the drive voltage provided by the charge pump 100 as the drive signal. The third state is where the first switch S1 is open, and the second switch S2 is closed, which grounds the drive output terminal O.

In the charge pump drive circuit provided in the embodiment of the present disclosure, the output of the entire drive unit can be modified by arranging the switches in the drive voltage output module, and controlling each of the switches by the signal generation module. This enables rapid and precise control of the drive signal. Thus, the adjustment of the drive signal can be realized, and the more rapid and precise control of the drive signal can be enabled.

The structural relationship and working principle of the control signal generation module within the charge pump drive circuit provided in the embodiment of the present disclosure are explained below.

Figure 3:
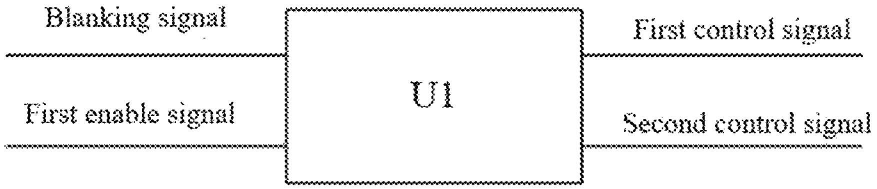
FIG. 3 is a structural schematic diagram of a control signal generation module in a charge pump drive circuit provided in the embodiment of the present disclosure.

FIG. 3 is a structural schematic diagram of a control signal generation module in a charge pump drive circuit provided in the embodiment of the present disclosure. Referring to FIG. 3, the control signal generation module 210 includes a first signal generator U1.

The output terminal of the first signal generator U1 is connected to the control terminal of the first switch S1 and the control terminal of the second switch S2, respectively. The input terminal of the first signal generator U1 is configured to receive a blanking signal and a first enable signal.

Optionally, the first signal generator can be a control circuit, e.g., can be a logic control circuit.

The input to the first signal generator U1 can include a blanking signal and a first enable signal, and the output can include a first control signal and a second control signal.

The blanking signal can be a time-domain blanking signal, and the first enable signal can be a gate-driven enable signal, which provides enablement through the gate of the driving transistor.

The first signal generator U1 can generate the first control signal and the second control signal based on the above blanking signal and the first enable signal, and can send the first control signal to the first switch S1 and the second control signal to the second switch S2.

Optionally, the first control signal and the second control signal can be any of the aforementioned blanking signal or the first enable signal. The first signal generator U1 can serve as a signal selector; for instance, if the blanking signal is used as the first control signal, the first control signal will control the first switch to be open, whereas if the first enable signal is used as the first control signal, the first control signal will control the first switch to be closed. Similarly, if the blanking signal is used as the second control signal, the second control signal will control the second switch to be open, and if the first enable signal is used as the second control signal, the second control signal will control the second switch to be closed.

In the charge pump drive circuit provided by the embodiment of the present disclosure, the control signal generation module can include a first signal generator, wherein the output terminal of the first signal generator is connected to the control terminal of the first switch and the control terminal of the second switch, respectively. The input terminal of the first signal generator is configured to receive a blanking signal and a first enable signal. Through the first signal generator, more accurate and rapid control of the first switch and second switch can be achieved, thereby allowing for a more precise output of the drive signal.

The following explains another structure of the control signal generation module in the charge pump drive circuit provided in the embodiment of the present disclosure, along with its corresponding working principle.

Figure 4:
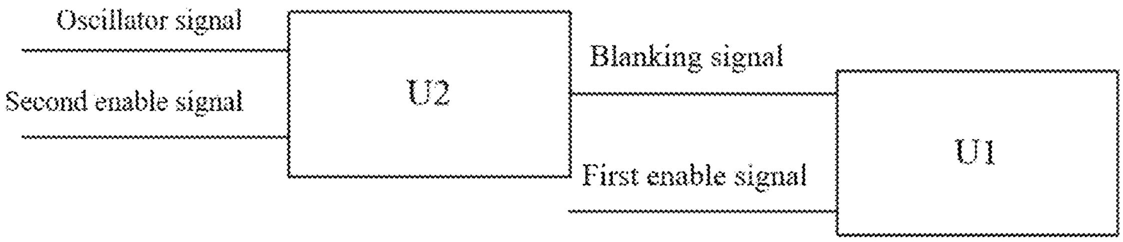
FIG. 4 is another structural schematic diagram of a control signal generation module in a charge pump drive circuit provided in the embodiment of the present disclosure.

FIG. 4 is another structural schematic diagram of a control signal generation module in a charge pump drive circuit provided in the embodiment of the present disclosure. Referring to FIG. 4, the control signal generation module 210 includes a second signal generator U2.

The output terminal of the second signal generator U2 is connected to the input terminal of the first signal generator U1 and is configured to provide the blanking signal to the first signal generator U1. The input terminal of the second signal generator U2 is configured to receive a second enable signal and a clock signal, and the second signal generator U2 is configured to generate the blanking signal according to the second enable signal and the clock signal.

Optionally, the second signal generator U2 can be a control circuit, e.g., can be a logic control circuit.

Optionally, the input of the second signal generator U2 can be a second enable signal and a clock signal, and the output of the second signal generator U2 can be the blanking signal.

In other words, the output terminal of the second signal generator U2 can connect to the input terminal of the first signal generator U1, so that the blanking signal input to the first signal generator U1 is provided by the second signal generator U2.

The clock signal is the clock signal input to the charge pump described above, meaning the clock signal can be input to both the charge pump and the second signal generator U2.

In actual use, the two can be the same signal output by the same device, and there is no specific limitation here.

The second signal generator U2, during its operation, can perform sampling on the second enable signal based on the clock signal, thereby obtaining the aforementioned blanking signal. After obtaining the blanking signal, it can transmit the blanking signal to the first signal generator U1.

It should be noted that, in actual operation, multiple drive units 200 can be included; therefore, correspondingly, multiple first signal generators U1 and second signal generators U2 can also be provided. FIG. 3 and FIG. 4 use two drive units 200 as examples, but in practical implementation, more drive units and their respective signal generators U1 and signal generators U2 can be provided, without limitation to those illustrated in the figures.

The following explains the structure of the drive control system provided in the present disclosure and its structural relationship.

Figure 5:
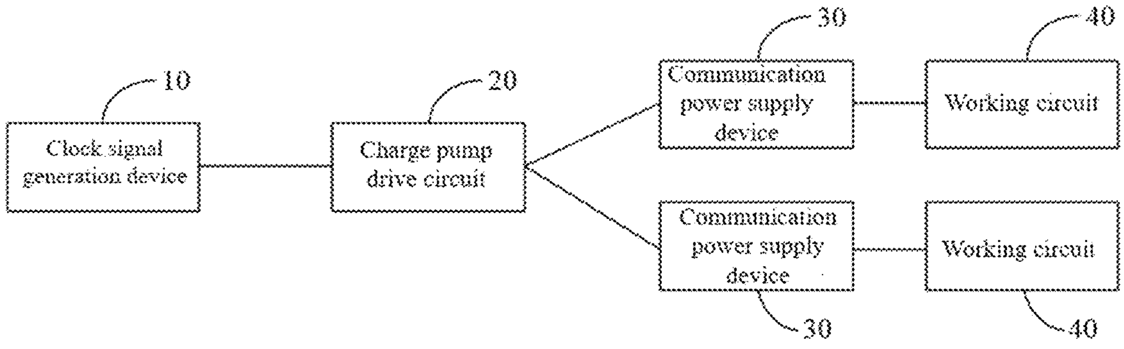
FIG. 5 is a structural schematic diagram of a drive control system provided in the embodiment of the present disclosure.

FIG. 5 is a structural schematic diagram of a drive control system provided in the embodiment of the present disclosure. Referring to FIG. 5, a drive control system is provided, including a clock signal generation device 10, a charge pump drive circuit 20, at least two communication power supply devices 30, and a working circuit 40.

The communication power supply devices 30 are connected to the charge pump drive circuit 20 and the working circuit 40, respectively. The charge pump drive circuit 20 is configured to provide a drive signal to the communication power supply devices 30, and the communication power supply devices 30 are configured to provide a working voltage to the working circuit 40 based on the drive signal. The clock signal generation device 10 is connected to the charge pump drive circuit 20, and the clock signal generation device 10 is configured to provide a clock signal to the charge pump drive circuit 20.

Optionally, the clock signal generation device 10 can be a device configured to generate a clock signal, and its output can be a clock signal, where the clock signal can be transmitted to the charge pump drive circuit 20. Optionally, in the charge pump drive circuit 20, the signal connected to the input terminal of the charge pump and the signal connected to the input terminal of the second signal generator can both be the clock signal.

The charge pump drive circuit 20 is the circuit that includes multiple drive units as explained in the previous FIG. 1 to FIG. 4, and will not be reiterated here.

Two or more communication power supply devices 30 can be provided. The communication power supply device 30 can be configured to connect the charge pump drive circuit 20 and the working circuit 40, and to provide the working voltage to the working circuit under the drive signal sent by the charge pump drive circuit 20.

The working circuit 40 can be any type of circuit that requires powered operation, with no specific type limitations imposed here. The working voltage required during the operation of the working circuit 40 can be provided by the aforementioned communication power supply device 30.

In the drive control system provided in the embodiment of the present disclosure, it can further include a clock signal generation device, a charge pump drive circuit, at least two communication power supply devices, and a working circuit. The communication power supply devices are connected to the charge pump drive circuit and the working circuit, respectively. The charge pump drive circuit is configured to provide a drive signal to the communication power supply devices, and the communication power supply devices are configured to provide a working voltage to the working circuit based on the drive signal. The clock signal generation device is connected to the charge pump drive circuit, and the clock signal generation device is configured to provide a clock signal to the charge pump drive circuit. The charge pump in the charge pump drive circuit can ensure that no mutual interference occurs between the drive units, thus reducing the area occupied by components in the circuit by using only a single charge pump, and, correspondingly, decreasing the overall power consumption of the circuit. Therefore, the area occupied by the entire drive control system and the power consumption of the circuit can be reduced. Furthermore, based on the drive control system, it is possible to achieve more accurate and rapid power control for the corresponding working circuit, thus enhancing the operational efficiency of the system.

The following explains the structural relationship and the operational principle of the drive control system provided in the present disclosure.

Figure 6:
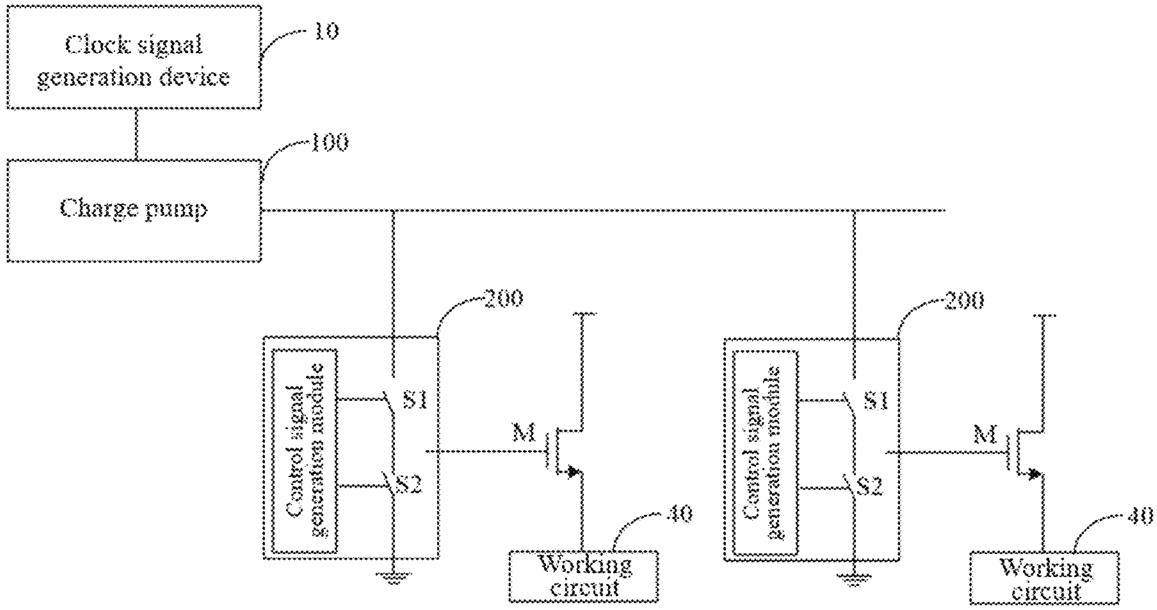
FIG. 6 is another structural schematic diagram of a drive control system provided in the embodiment of the present disclosure.

FIG. 6 is another structural schematic diagram of a drive control system provided in the embodiment of the present disclosure. Referring to FIG. 6, the communication power supply device 30 is a high-side power transistor M. A first terminal of the high-side power transistor M is connected to the working circuit 40, a second terminal of the high-side power transistor M is connected to the power supply, and a third terminal of the high-side power transistor is connected to the charge pump drive circuit 20.

Optionally, the high-side power transistor M can be a metal-oxide-semiconductor field-effect transistor (MOSFET). The gate of the high-side power transistor M can be the third terminal of the high-side power transistor M, the source of the high-side power transistor M can be the second terminal of the high-side power transistor M, and the drain of the high-side power transistor M can be the first terminal of the high-side power transistor M.

During operation, if the charge pump drive circuit 20 outputs a drive signal, the gate of the high-side power transistor M will be driven by the drive signal to turn on, thereby allowing the source of the high-side power transistor M to provide the supply voltage to the drain of the high-side power transistor M and supplying power to the connected working circuit 40, to enable the normal operation of the working circuit 40.

Correspondingly, if the charge pump drive circuit 20 does not output a drive signal, the gate of the high-side power transistor M will not receive the drive signal and, accordingly, will not turn on, which prevents the source of the high-side power transistor M from providing voltage to the drain, thus resulting in no corresponding power supply to the working circuit 40.

It should be noted that a number of high-side power transistors M is the same as a number of drive units in the charge pump drive circuit 20.

For example, if two drive units are provided in the charge pump drive circuit 20, then the number of high-side power transistors M can also be two, with each of the two high-side power transistors M connected to the drive output terminal of each drive unit. Correspondingly, if N drive units are provided in the charge pump drive circuit 20, the number of high-side power transistors M can also be N, with no specific limitations herein, as the exact number can be set based on actual requirements.

Optionally, the third terminal of each high-side power transistor M is connected to the drive output terminal in the drive voltage output module of each drive unit in the charge pump drive circuit, respectively.

It should be noted that in actual operation, the working circuit 40 can be single or multi-channel. If multi-channel is provided, different working circuits 40 can be connected to different high-side power transistors M, thus enabling separate power supply control. If single-channel is provided, the circuit can include multiple interfaces requiring power input, with each interface connected to different high-side power transistors M.

For instance, with two high-side power transistors M, two drive units, and two working circuits, in actual operation, under an initial stable state, the first high-side power transistor is in the off state and the second high-side power transistor is in the on state. The gate of the second high-side power transistor is connected to the drive voltage of the charge pump to maintain the voltage at the gate above the supply voltage at the source.

At this time, if the first high-side power transistor needs to switch to the on state, at a certain moment, the first switch in the first drive unit is controlled to switch to the on state and the second switch is to switch to the off state. The drive voltage of the gate of the first high-side power transistor increases from 0 to 2 times the supply voltage, which consumes the charge stored in the capacitor of the charge pump during the process, thereby reducing the voltage at the output terminal.

To prevent a subsequent drop in the drive voltage of the gate of the second high-side power transistor, a time-domain blanking signal can be used to temporarily disconnect the second high-side power transistor from the charge pump. During this period, the first switch in the second drive unit briefly switches to the off state and the second switch switches to the on state, allowing the drive voltage of the gate to be maintained by the gate capacitance of the second high-side power transistor.

The above approach can ensure that when different drive units provide drive signals, there is no mutual influence, thus allowing for the arrangement of a single charge pump instead of multiple charge pumps.

The above are just specific embodiments of the present disclosure, but the scope of protection of the present disclosure is not limited to the embodiments. Any variations or substitutions readily apparent to those skilled in the art within the technical scope disclosed in the present disclosure should be encompassed within the scope of protection of the present disclosure. Therefore, the protection scope of the present disclosure shall be of protection of the claims.

The above is only a preferred embodiment of the present disclosure, which is not intended to limit, and the present disclosure may have various changes and variations for those skilled in the art. Any modification, equivalent substitution, improvement, etc. made within the spirit and principles of the present disclosure shall be included in the scope of protection of the present disclosure.

INDUSTRIAL PRACTICALITY

A charge pump drive circuit and a drive control system, provided by the embodiments of the present disclosure, reduce the area occupied by components in the circuit and lower the overall power consumption of the circuit by using only a single charge pump.

The invention claimed is:

1. A charge pump drive circuit, comprising:

a charge pump configured to receive a clock signal and generate an output voltage; and at least two drive units, each drive unit comprising:

i. a control signal generation module; and ii. a drive voltage output module;

wherein each control signal generation module is connected to a corresponding drive voltage output module; and wherein each control signal generation module is configured:

to generate a first control signal and a second control signal, and to output the first control signal and the second control signal to a corresponding drive voltage output module; and wherein each drive voltage output module is configured:

to output a drive voltage to a corresponding external electrical device based upon the output voltage; and to adjust a signal output mode according to the first control signal and the second control signal;

wherein the charge pump is configured to alternatively provide the output voltage to each drive voltage output module in a non-overlapping manner according to the clock signal.

2. The charge pump drive circuit according to claim 1, wherein each drive voltage output module comprises a first switch, a second switch, and a drive output terminal;

a first terminal of the first switch is connected to the charge pump; a second terminal of the first switch is connected to a first terminal of the second switch and the drive output terminal, respectively; and a second terminal of the second switch is grounded;

a control terminal of the first switch and a control terminal of the second switch are connected to the control signal generation module, respectively; and the drive output terminal is configured to provide a drive signal to the external electrical device.

3. The charge pump drive circuit according to claim 2, wherein each control signal generation module comprises a first signal generator;

an output terminal of the first signal generator is connected to the control terminal of the first switch and the control terminal of the second switch, respectively; and an input terminal of the first signal generator is configured to receive a blanking signal and a first enable signal.

4. The charge pump drive circuit according to claim 3, wherein each first signal generator is a logic control circuit.

5. The charge pump drive circuit according to claim 3, wherein each control signal generation module further comprises a second signal generator;

an output terminal of the second signal generator is connected to the input terminal of the first signal generator and is configured to provide the blanking signal to the first signal generator; and an input terminal of the second signal generator is configured to receive a second enable signal and the clock signal, and the second signal generator is configured to generate the blanking signal according to the second enable signal and the clock signal.

6. The charge pump drive circuit according to claim 5, wherein each second signal generator is a logic control circuit.

7. A drive control system, comprising a clock signal generation device, the charge pump drive circuit according to claim 1, at least two communication power supply devices, and a working circuit;

the communication power supply devices are connected to the charge pump drive circuit and the working circuit, respectively; the charge pump drive circuit is configured to provide a drive signal to the communication power supply devices; and the communication power supply devices are configured to provide a working voltage to the working circuit based on the drive signal; and the clock signal generation device is connected to the charge pump drive circuit, and the clock signal generation device is configured to provide the clock signal to the charge pump drive circuit.

8. The drive control system according to claim 7, wherein the communication power supply device is a high-side power transistor, a first terminal of the high-side power transistor is connected to the working circuit, a second terminal of the high-side power transistor is connected to a power supply, and a third terminal of the high-side power transistor is connected to the charge pump drive circuit.

9. The drive control system according to claim 8, wherein the number of high-side power transistors is the same as the number of drive units in the charge pump drive circuit.

10. The drive control system according to claim 9, wherein the third terminal of each high-side power transistor is connected to the drive output terminal in the drive voltage output module of each drive unit in the charge pump drive circuit, respectively.

11. The drive control system according to claim 7, wherein each drive voltage output module comprises a first switch, a second switch, and a drive output terminal;

a first terminal of the first switch is connected to the charge pump; a second terminal of the first switch is connected to a first terminal of the second switch and the drive output terminal, respectively; and a second terminal of the second switch is grounded;

a control terminal of the first switch and a control terminal of the second switch are connected to the control signal generation module, respectively; and the drive output terminal is configured to provide a drive signal to the external electrical device.

12. The drive control system according to claim 11, wherein each control signal generation module comprises a first signal generator;

an output terminal of the first signal generator is connected to the control terminal of the first switch and the control terminal of the second switch, respectively; and an input terminal of the first signal generator is configured to receive a blanking signal and a first enable signal.

13. The drive control system according to claim 12, wherein each signal generator is a logic control circuit.

14. The drive control system according to claim 12, wherein each control signal generation module further comprises a second signal generator;

an output terminal of the second signal generator is connected to the input terminal of the first signal generator and is configured to provide the blanking signal to the first signal generator; and an input terminal of the second signal generator is configured to receive a second enable signal and the clock signal, and the second signal generator is configured to generate the blanking signal according to the second enable signal and the clock signal.

15. The drive control system according to claim 14, wherein each second signal generator is a logic control circuit.

* * * * *